Patented May 27, 1941

2,243,191

UNITED STATES PATENT OFFICE 2,243,191

PRODUCTION OF OLEFINS AND DIOLEFINS

Adolf Cantzler and Hans Krekeler, Mannheim, Germany, assignors to Jasco Incorporated, a corporation of Louisiana No Drawing. Application December 9, 1939, Serial No. 308,432. In Germany October 4, 1938

3 Claims. (Cl. 260—677)

The present invention relates to the production of unsaturated compounds, in particular to the production of olefins and diolefins.

The preparation of unsaturated hydrocarbons or chlorinated unsaturated hydrocarbons by the splitting off of hydrogen chloride from chlorohydrocarbons, wherein the chlorine atoms are attached to paraffinic carbon atoms, i. e. carbon atoms free from double bonds, is most favorably carried out by leading the vapours starting materials through vessels heated to temperatures high enough to cause the splitting off of hydrogen chloride but low enough to prevent the splitting of the carbon chain. Thus, the technically important production of butadiene from dichlorbutane may be carried out by heating dichlorbutane to temperatures exceeding 500° C., if desired in the presence of catalysts. Since this reaction is endothermic and requires much heat, it is necessary in order to be able to carry out the splitting completely and rapidly to work in vessels which have a good thermal conductivity and which are stable to the hydrogen chloride formed during the reaction and which do not give rise to decompositions or deposits in the reaction vessel.

We have now found that for the vessels used in the splitting off of hydrogen chloride from chloro-hydrocarbons in the gaseous state by the action of heat, in particular in the preparation of butadiene from dichlorbutane, a steel is advantageous as the constructional material which contains, in addition to iron, considerable amounts of chromium and a smaller amount of molybdenum. The chromium content of the steel preferably lies between about 30 and 40 per cent while the molybdenum content is of the order of from about 1 to 5 per cent.

Generally speaking the reaction vessel is a tube of a cast steel of the above mentioned composition. Vessels of other shapes, as for example bundles of tubes, tubular coils or containers with insertions may also be used.

When using these cast steels the reaction temperature may lie between about 500° and 740° C., particularly between 600 and 740° C. The upper limit of 740° C. is preferably not exceeded since there is then a danger of side reactions. The reaction may be carried out without catalysts in empty vessels or also in the presence of catalysts promoting the splitting off of hydrogen chloride, as for example silica gel, active carbon or other porous substances which may also be impregnated with chlorides of polyvalent metals, as for example calcium, barium, magnesium or zinc chloride. Reduced pressure or diluent gases may be employed.

The following example illustrates our mode of preparing butadiene according to this invention.

Example 10 liters of silica gel are arranged in a cast tube having a diameter of 145 millimeters and a length of 1 meter which consists of a steel containing 32 per cent of chromium and 1 per cent of molybdenum and which is provided with external and internal heating. The vapors of 5 liters of 2.3-dichlor-n-butane per hour are led through the tube under a pressure of 40 millimeters (mercury gauge) at 620° C. After removing the hydrogen chloride formed, 1.3-butadiene is obtained in a yield of 80 per cent.

The preparation of butadiene may be carried on in the tube in a continuous manner for weeks without appreciable amounts of decomposition products separating in the tube or the tube itself being destroyed.

Although we have described this invention in connection with the preparation of butadiene from dichlorbutane, the same may nevertheless be advantageously used in preparing other unsaturated hydrocarbons or chlorinated unsaturated hydrocarbons. Thus, it is possible to produce monoolefinic hydrocarbons such as propylene, butylene, amylene, cyclohexene or styrene from the corresponding saturated monochlor compounds, other diolefins such as isoprene from dischlorpentane or to produce chlorinated olefins such as trichlor ethylene from tetrachlor ethane. When preparing chlorinated olefins, the reaction temperature may be lower than that required for the production of unsaturated hydrocarbons.

What we claim is:

1. In the production of unsaturated compounds by splitting off hydrogen chloride from chlorinated hydrocarbons in the gas phase at elevated temperatures the step which comprises passing a chlorinated hydrocarbon, wherein chlorine is attached to saturated carbon atoms in the vapor state through heated vessels constructed of a steel containing from 30 to 40 per cent of chromium and from 1 to 5 per cent of molybdenum.

2. In the production of butadiene by splitting off hydrogen chloride from dichlorbutane in the gas phase at elevated temperatures the step which comprises passing the vapor of dichlorbutane through heated vessels constructed of a steel containing from 30 to 40 per cent of chromium and from 1 to 5 per cent of molybdenum.

3. In the production of butadiene by splitting off hydrogen chloride from dichlorbutane in the gas phase at elevated temperatures the step which comprises passing the vapor of dichlorbutane through heated vessels constructed of a steel containing from 30 to 40 per cent of chromium and from 1 to 5 per cent of molybdenum which contain a solid catalyst capable of promoting the splitting off of hydrogen chloride.

ADOLF CANTZLER.
HANS KREKELER.